A. Jaminet,
Water Filter,
Nº 19,929.    Patented Apr. 13, 1858.
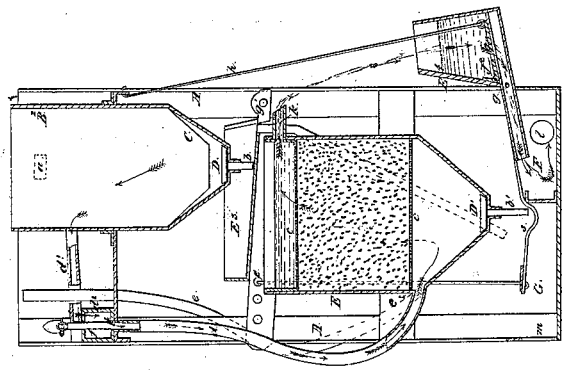
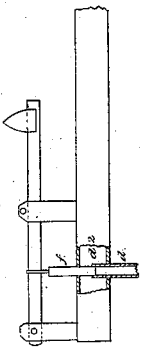
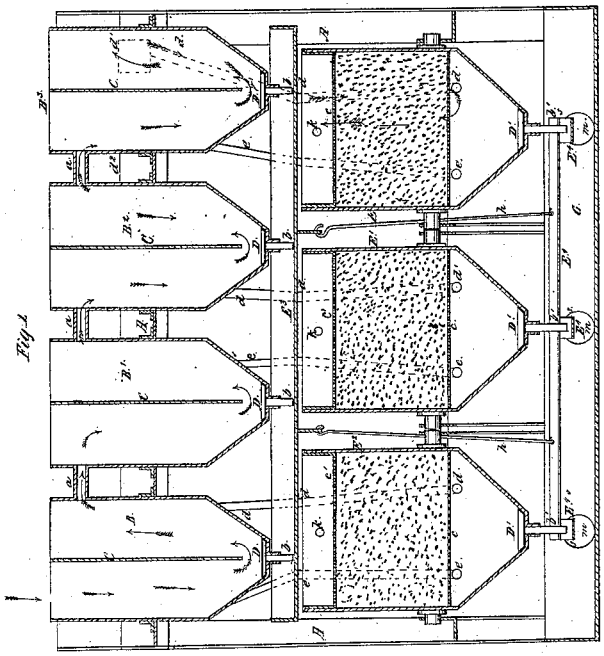
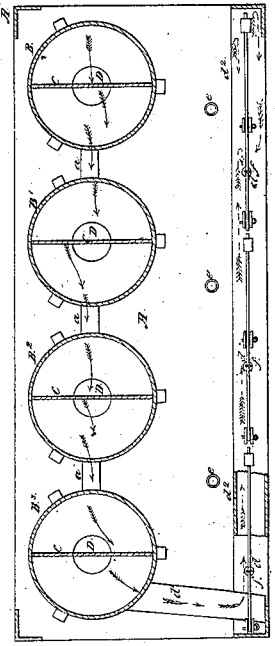

UNITED STATES PATENT OFFICE.

A. JAMINET, OF FLORISANT, MISSOURI.

WATER-FILTER.

Specification of Letters Patent No. 19,929, dated April 13, 1858.

*To all whom it may concern:*

Be it known that I, A. JAMINET, of Florisant, in the county of St. Louis and State of Missouri, have invented a new and useful Improvement in Machines for Separating and Filtering Water and other Fluids; and I do hereby declare that the following is a full, clear, and exact description of the same, reference being had to the accompanying drawings, forming part of this specification, in which—

Figure 1, is a vertical longitudinal section of a separating and filtering machine constructed after my invention. Fig. 2, is a vertical transverse section of the same. Fig. 3, is a horizontal section of the same. Fig. 4, is a side view and partial section of a portion of the machine detached.

Similar letters of reference in each of the several figures indicate corresponding parts.

The main design of my invention, is to purify water which is to be used in steam boilers, and thereby prevent incrustations of lime and sediment forming over the inner surface of the same.

The nature of my invention consists in combining one or more peculiar, double chambered preparatory separating vessels, with one or more filtering vessels, and furnishing both sets of vessels with puppet or other valves at their lower ends, and operating said valves by means of tilting troughs through the agency of the weight of the water; all substantially as and for the purposes presently stated.

To enable others skilled in the art to make and use my invention, I will proceed to described its construction and operation.

A, represents the frame of the machine.

B, B', B², B³, are four preparatory separating vessels arranged side by side within the upper part of the frame A, as shown. Each of these vessels is divided into two chambers by a partition C, which extends from the top to near the bottom of the vessel, in a manner to allow a free communication between the two chambers. A communication is established between all the vessels by means of branch tubes $a, a, a, a$, as illustrated. In the lower funnel shaped end of each of the vessels a passage is formed, and to these passages, puppet valve D, D, D, D, with downward projecting stems $b, b,$ are fitted as shown.

E, E', E², are three filtering vessels arranged below the separating vessels B, B', B², B³, in the lower part of the frame A. Each of these vessels is furnished at its lower funnel shaped ends with a passage to which is fitted a puppet valve D' said valves having their stems $b', b', b'$, projecting downward some distance below the bottom of the vessels as shown. The filtering medium saw dust, is placed in these vessels at a point intermediate between the top and bottom thereof, being confined by two perforated horizontal plates $c, c'$, as shown. A communication is established between the separating vessels and the filtering vessels by means of pipes $d, d', d^2$, and air being allowed to escape from below the filtering medium by means of tubes $e, e, e$, which are arranged as shown in the drawing; and the communication of all or a portion of the filtering vessels with the separating vessels being shut off by self-closing vertical valves $f, f, f$, which are fitted to the pipes $d, d, d$.

E³, E⁴, are two tilting troughs, the upper trough E³, being arranged underneath the separating vessels and serving to receive the sediment which is discharged at intervals, and the lower trough E⁴, in rear of the filtering vessels in the manner shown in the drawing. These two vessels turn on fulcra $g, g'$, and are connected together by loose connecting links $h, h, h$, in the manner shown in the drawing. The upper side of the bottom of the trough E³, just touches the lower end of the puppet valve stems $b, b, b, b$, and the upper sides of the inclined arms of the trough E⁴, extend under and just touch the lower end of the puppet valve stems $b', b', b'$, as will be seen from the drawing.

The trough E, serves for receiving the filtered water as it flows from the upper part of the vessels E, E¹, E², through the branch pipes $k, k$, and has a discharge passage $j$, the latter being partially covered by a perforated valve $j^1$ which opens and facilitates the escape of water when the trough E⁴, becomes full and tilts.

F, is a general receiving chamber for receiving and conducting off the filtered water from the trough E⁴, by means of the passage $b$; and G, is a general receiving chamber for receiving the sediment which is discharged through the valves $b, b'$, and conducting it off by means of passages $m, m, m$, as illustrated.

From the above description of parts and the drawing, it may be evident, if the parts be in the condition shown in Fig. 1, and the water, to be purified, be introduced into one of the chambers of the separating vessel B, that it will descend to the bottom of said vessel and then ascend on the opposite side of the partition $c$, in the other chamber of the vessel and pass out through the branch tube, into the next vessel $B^1$, where it will descend and ascend as it did in B, and so on until it reaches the passage in the vessel $B^3$. The water, having now been deprived of a greater portion of its sediment, owing to the circuitous course it was compelled to take, passes down through the pipes $d^1$, $d^2$, $d$, into the bottom of the filtering vessels E, $E^1$, $E^2$, and ascends through, and above the filtering medium, and escapes in a purified state by the branch tubes, $k$, $k$, it emptying into the trough $E^4$, and flowing slowly from said trough into the general receiving chamber E. At intervals, owing to the water not flowing from the trough $E^4$, as rapidly as it is received, the trough fills and owing to its peculiar arrangement tilts backward and thereby fully opens the perforated valve $j^1$, and through arms $s$, $s$, $s$, raises and opens the puppet valves $D'$, and through the connecting rods $h$, $h'$, and through $E^3$, raises and opens the puppet valves D, thus opening the valve $j'$, and puppet valves D, $D'$, facilitating the flowing of the water out of the trough $E^4$, and allowing all the sediment which has been accumulating in the bottom of the separating and filtering vessels to escape, and thereby preventing overflowing of the filtered water in the trough $E^4$, and also a choking up of the vessels B, $B^1$, $B^2$, $B^3$, E, $E^1$, $E^2$.

What I claim as my invention and desire to secure by Letters Patent, is—

Combining one or more double chambered preparatory separating vessels B, $B^1$, $B^2$, $B^3$, with one or more filtering vessels E, $E^1$, $E^2$, and furnishing both sets of vessels with puppet, or other valves D, $D'$, and operating said valves by means of tilting troughs through the agency of the weight of the filtered water; all substantially as and for the purposes set forth.

The above specification of my improvement in filters and separators signed by me, this eighth day of February 1858.

A. JAMINET.

Witnesses:
G. YORKE AT LEE,
H. H. YOUNG.